P. ANDERSON.

CHAINS FOR ELEVATORS.

No. 7,001.

Reissued March 21, 1876.

WITNESSES

Wm A Skinkle

F. Stich

By his Attorney

INVENTOR

Philander Anderson

Wm D. Baldwin

N. PETERS, PHOTO-LITHOGRAPHER, WASHINGTON, D. C.

UNITED STATES PATENT OFFICE.

PHILANDER ANDERSON, OF NEW YORK, N. Y., ASSIGNOR, BY MESNE ASSIGNMENTS, TO C. H. & L. J. McCORMICK, OF CHICAGO, ILL.

IMPROVEMENT IN CHAINS FOR ELEVATORS.

Specification forming part of Letters Patent No. 47,595, dated May 2, 1865; reissue No. 7,001, dated March 21, 1876; application filed February 12, 1876.

*To all whom it may concern:*

Be it known that I, PHILANDER ANDERSON, formerly of East Avon, Livingston county, New York, but now residing in New York city, have invented certain new and useful Improvements in the Construction of Chains for Water-Elevators, and for other purposes; and I do hereby declare that the following is a full, clear, and exact description thereof, reference being had to the accompanying drawings, making part of this specification, in which—

Figure 1:
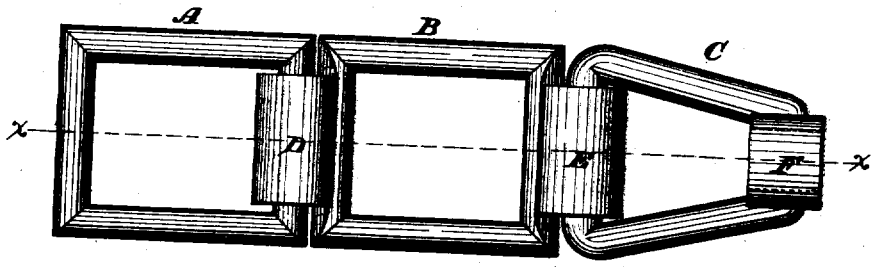
Figure 2:
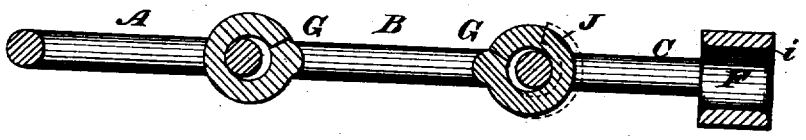
Figure 3:
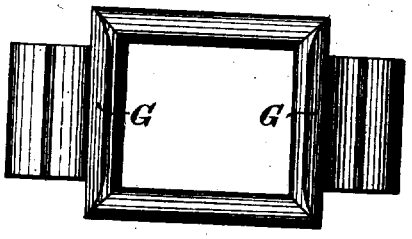

Figure 1 is a plan of my improved chain. Fig. 2 is a section thereof, taken in the plane indicated by the line *x x* in Fig. 1. Fig. 3 is a plan of the coupling-link detached, showing the coupling-lips, and open as they are cast.

This invention relates to that class of chains known as "square link" or "flat chains," and which are used on water-elevators having self-dumping buckets; and its object is to provide a very strong and durable article for such purposes at much less cost than the frail chains heretofore used therefor.

To enable others to work my invention, I will describe it in detail with reference to the accompanying drawings.

Every alternate link A in the chain is a parallelogram, its section being round, oval, or flat, as may be desired, and every other one, B, may be the same shape, but is provided at each end with curved lips or clasps D E, which are cast partially open, as indicated by the dotted lines J in Fig. 2, by setting a core in the molds to form the circle to receive the links A. Fig. 3 shows this link as it comes from the foundery, its clasps D and E being open; but as they are made malleable, their open edge is readily made to impinge upon the shoulders G when "closing up" the chain, as seen in Figs. 1 and 2.

The chain is connected to the rope of the windlass by means of the swivel-link C, the head F of which is also cast with a core of a proper shape to produce a round edge, as seen at *i* in Fig. 2. This prevents the swivel from cutting the rope off, which defect has been so troublesome heretofore.

The link B may be made with but one clasp, the other end being plain, and in this case the links forming the chain would all be the same.

What I claim as my invention, and desire to secure by Letters Patent, is—

1. A chain-link, constructed substantially as hereinbefore set forth, with a lip cast thereon to clasp the adjacent link.

2. The combination, substantially as hereinbefore set forth, of a plain link, with a link cast with a lip thereon, to clasp the plain link.

3. As an improved article of manufacture, the malleable iron square or flat link chain, the links and swivel-link being constructed and connected in the manner shown, and for purposes specified.

PHILANDER ANDERSON.

Witnesses:
W. H. LAURENCE,
CHAS. COLAHAN.